(12) United States Patent  
Ice

(10) Patent No.: US 9,016,878 B1  
(45) Date of Patent: Apr. 28, 2015

(54) MOLDED OPTICAL ELEMENT WITH PARABOLIC MIRROR AND INTEGRAL PLANE TURNING MIRROR

(71) Applicant: Redox Biomedical, Inc., Menlo Park, CA (US)

(72) Inventor: Donald A. Ice, Milpitas, CA (US)

(73) Assignee: Redox Biomedical, Inc., Menlo Park, CA (US)

( * ) Notice: Subject to any disclaimer, the term of this patent is extended or adjusted under 35 U.S.C. 154(b) by 372 days.

(21) Appl. No.: 13/670,314

(22) Filed: Nov. 6, 2012

Related U.S. Application Data

(60) Provisional application No. 61/558,608, filed on Nov. 11, 2011.

(51) Int. Cl.  
*G02B 7/182* (2006.01)  
*G02B 26/08* (2006.01)

(52) U.S. Cl.  
CPC ................. *G02B 26/0825* (2013.01)

(58) Field of Classification Search  
CPC ...... G02B 26/0825; G02B 7/182; G02B 5/10; G02B 7/183; G02B 5/08; G20B 26/06  
USPC ................... 359/846, 847, 850, 853  
See application file for complete search history.

(56) References Cited

U.S. PATENT DOCUMENTS

2010/0201977 A1* 8/2010 Milosevic et al. ............ 356/301

* cited by examiner

*Primary Examiner* — Euncha Cherry  
(74) *Attorney, Agent, or Firm* — Fenwick & West LLP

(57) ABSTRACT

An optical element is described that is a single molded piece. It includes a parabolic mirror configured to reflect substantially collimated light incident along a first axis. The reflected light converges towards a virtual focal point located along a second axis. The piece also includes a plane turning mirror positioned with respect to the parabolic mirror such that the converging light hits a surface of the plane mirror after traveling a distance less than a focal length of the parabolic mirror. The plane mirror reflects the incident converging light outward as exit light, which focuses at a final focus point located a nonzero distance from the plane mirror. The final focus point is located in a plane defined by the second axis and a third axis, and is offset at a nonzero angle from the third axis relative to a point on the surface of the plane mirror.

15 Claims, 13 Drawing Sheets

100

MOLDED OPTICAL ELEMENT WITH PARABOLIC MIRROR AND INTEGRAL PLANE TURNING MIRROR

CROSS REFERENCE TO RELATED APPLICATION

This application claims priority under 35 U.S.C. §119(e) to U.S. Provisional Patent Application Ser. No. 61/558,608, filed Nov. 11, 2011, entitled "Parabolic Mirror with Integral Plane Turning Mirror".

BACKGROUND

This invention relates generally to optics, and more particularly to reflective optics for use in Raman spectroscopy.

Raman spectroscopy is a powerful tool for studying properties of materials. Raman spectroscopy measures light that has been in-elastically scattered from a sample to measure properties of the sample. However, Raman scattering is a relatively weak effect, and as a consequence it can be difficult to measure small Raman signals. One particular source of noise that is particularly difficult to get rid of is errant Raman signals that may be generated by the optics that are used as part of the Raman spectroscopic system.

Errant Raman signals from the optics of the spectroscopic system get worse the more light provided. In order to obtain a useful Raman signal from a relatively weak source, a large amount light is input into the spectroscopic system in order to generate a Raman signal of measurable strength. The large amount of light will also, however, cause the optics to generate a large errant Raman signal. Thus, the problem cannot be solved by simply adding more light to the spectroscopic system.

Traditionally, this problem was solved by minimizing the use of optical elements between the light reflected from a sample being measured, and the detector detecting the Raman signals. While this works adequately in laboratory settings where space is not at a premium, this solution causes the Raman spectroscopic system to take up a great deal of space, making it impractical for many applications.

Thus, what is needed is an optical element which collects a large amount of scattered light collected from a sample and delivers it to a spectroscopic detector without passing through materials which would add their own errant Raman signature.

SUMMARY

An optical element is described that reflects incident light without producing additional Raman scattered light. The optical element is a single molded piece. In one embodiment, the single molded piece includes a parabolic mirror configured to reflect substantially collimated light incident along a first axis. The reflected light converges towards a focal point located along a second axis. The single molded piece also includes a plane turning mirror. The plane mirror is positioned with respect to the parabolic mirror such that the converging light from the parabolic mirror hits a surface of the plane mirror after traveling a distance less than a focal length of the parabolic mirror from the parabolic mirror. The plane mirror reflects the incident converging light outward as exit light, which focuses at a final focus point located a nonzero distance from the surface of the plane mirror. The final focus point is located in a plane defined by the second axis and a third axis perpendicular to the first and second axes. The final focus point is offset at a nonzero angle from the third axis relative to a point on the surface of the plane mirror.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An optical element is described that reflects incident light, producing little to no additional Raman scattered light. A pair of the optical components are used in a miniaturized Raman spectrometer. The pair of reflective optical elements allow Raman scattered light emitted from a biological sample to be collected, focused, and directed towards a detector.

Figure 1:
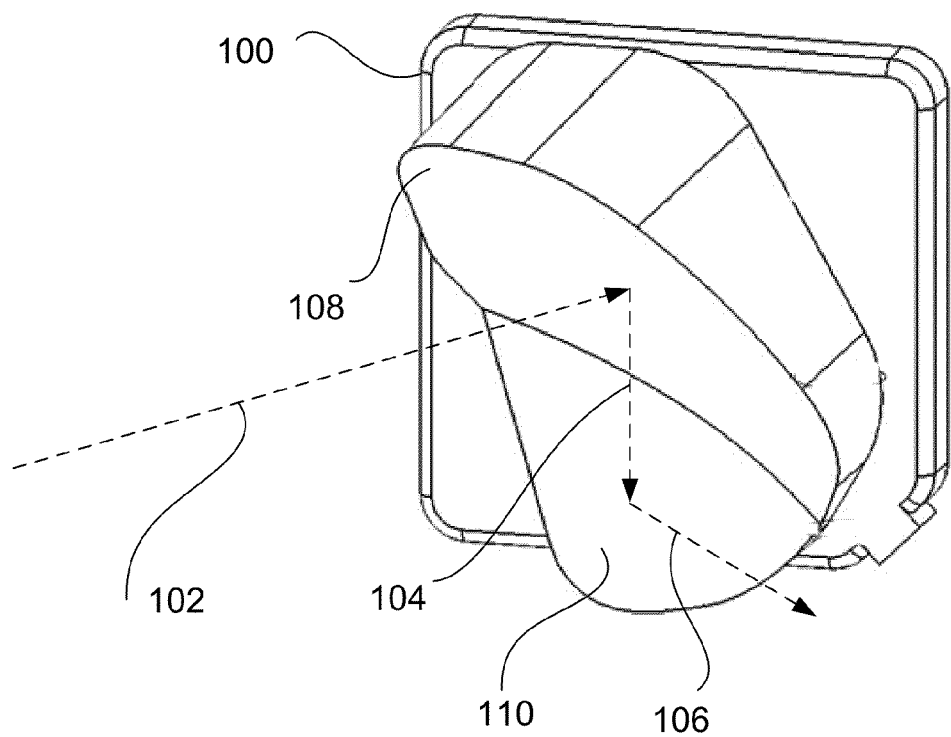
FIG. 1 is a diagram illustrating the reflection of a single ray of light by a molded optical element, according to one embodiment.

FIG. 1 is a diagram illustrating the reflection of a single ray of light by a molded optical element, according to one embodiment. The single molded optical element 100 includes a parabolic mirror 108 and an plane mirror 110. The plane mirror 110 and parabolic mirror 108 are oriented and positioned so as to have a specific geometric relationship relative to one another. To ensure that this geometric relationship remains substantially unchanged between different optical elements, the optical element is constructed as a single molded optical component, where the parabolic mirror 108 and the plane mirror 110 are different subparts of the same molded component. The parabolic mirror 108 and plane mirror 110 portions of the molded component are coated to cause those surfaces to be reflective.

Integrating both mirrors into a single molded component is further desirable because it reduces the number of parts that must be assembled to construct the device in which the optical element is used. If the optical element is to be used as part of a Raman spectrometer, the high degree of consistency in the geometric relationship between the parabolic mirror 108 and the plane mirror 110 provided by a single molded component construction reduces the variability in the optical alignment of the Raman spectrometer, thereby reducing variability in the overall intensity of the signal. In the case of a Raman spectrometer, the reflection of the light by optical element assists in introducing the light into the spectrometer, or in collecting the generated Raman light to be analyzed by a detector.

A substantially collimated plane wave of light 102 incident on the parabolic mirror 108 is reflected outward as converging light 104. Converging light 104 is directed by the parabolic mirror 108 towards a single focus point located a focal length away. The surface of the plane mirror 110 is positioned at a distance from the parabolic mirror 108 smaller than the focal length of the parabolic mirror 108. The plane mirror 110 is oriented to reflect the received converging light 104 outward as exit light 106 at an angle. The direction of the focused exit light 106 reflected from the plane mirror 110 is a direction other than the direction from which light 102 was received at the parabolic mirror 108.

Figure 2:
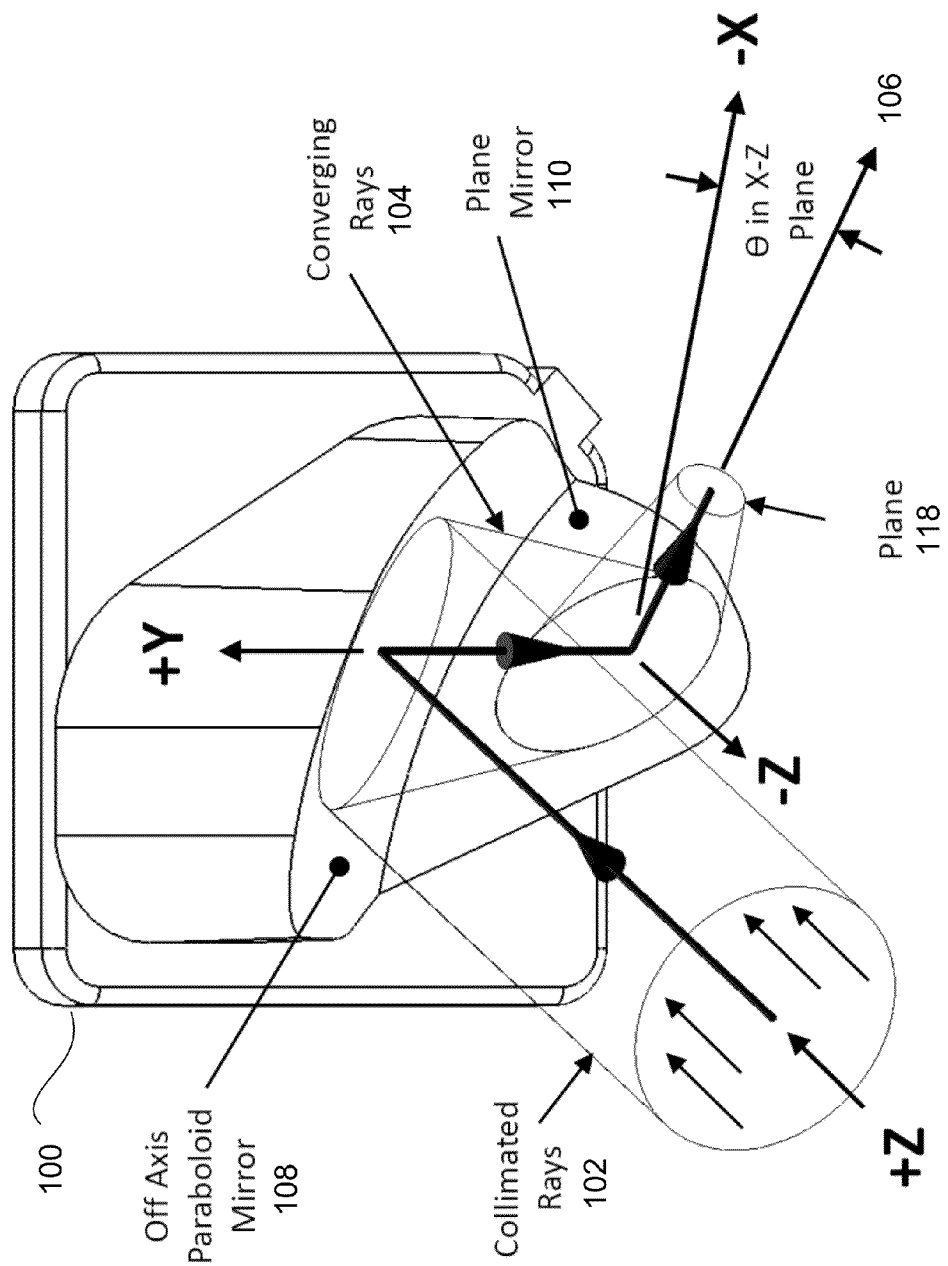
FIG. 2 is a diagram illustrating an optical path of light reflecting off a molded optical element according to a three dimensional Cartesian coordinate system, according to one embodiment.
Figure 8:
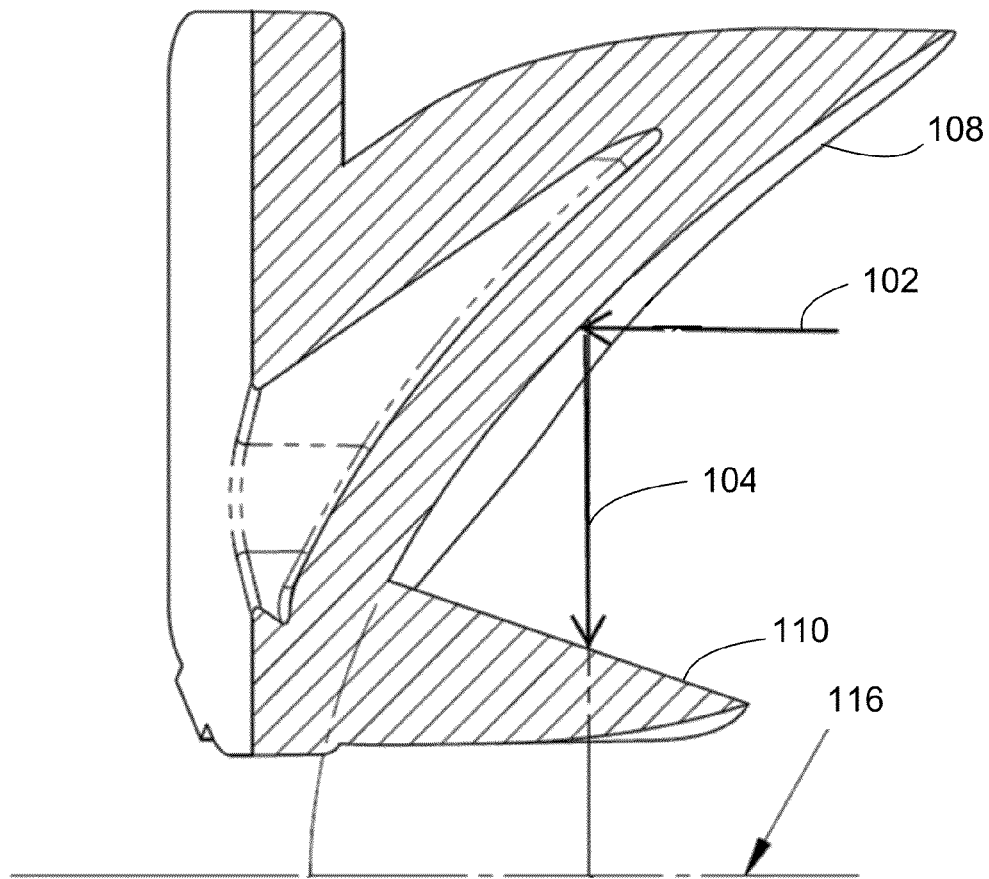
FIG. 8 illustrates a fifth view of a molded optical element, according to one embodiment.

FIG. 2 is a diagram illustrating an optical path of light reflecting off a molded optical element according to a three-dimensional Cartesian coordinate system, according to one embodiment. The coordinate system axis labels follow the right hand rule. The optical path of FIG. 2 is explained starting with collimated light beam 102. The collimated beam 102 travels toward the parabolic mirror in the +Z direction. That is, collimated beam 102 is incident to the parabolic mirror substantially along the +Z axis (or a first axis). The paraboloid mirror 108 is oriented with the axis of its parabola (or axis of revolution) in the Y-Z plane. One example of the axis of the parabola is illustrated in FIG. 8 as 116. In one embodiment, the axis of the parabola of mirror 108 is aligned parallel to the Z axis.

The collimated light beam 102 strikes (or hits) the off-axis paraboloid mirror 108 and is reflected and focused in the −Y direction as converging light 104. Converging light 104 would otherwise normally focus at a focal point located a focal length away on the −Y axis (or a second axis). In one embodiment, the focal length is 6.75 mm. However the converging beam 104 is intercepted by a plane mirror 110 interposed between the paraboloid mirror 108 and that focal point. Thus, the converging light 104 travels a distance less than the focal length of parabolic mirror 108 from the parabolic mirror 108 before being incident upon the plane turning mirror 110. This plane mirror 110 is tilted at a 45 degree angle from the X-Z plane and rotated around the Y axis. In one embodiment, illustrated as angle θ in FIG. 2, the rotation about the Y axis is minus 20 degrees from the −X axis (or a third axis), where the X axis travels through a center point of the converging light 104 that is incident upon the plane mirror 110. Because the converging light 104 does not reach the focal point along the −Y axis before being reflected by the plane mirror 110, this −Y axis focal point may be referred to as a "virtual" focal point.

The plane turning mirror 110 reflects the converging light 104 outward as exit light 106 along a plane parallel to the X-Z plane and in a direction dictated by the rotation of the plane mirror around the Y axis (e.g., 20 degrees). The light then converges on a "final" focal point located in a focal plane parallel to plane 118 that is perpendicular to the direction of the exit light 106.

The final focal point is a nonzero distance from the plane mirror 110. This distance may change based on the "height" of the plane turning mirror 110 relative to the parabolic mirror 108. This height represents the distance traveled by converging light 104 after being reflected by the parabolic mirror 108 before hitting the plane mirror 110. The larger the height (i.e., larger the distance) between parabolic mirror 108 and plane mirror 110, the shorter the distance between the final focal point and plane mirror 110. Conversely, the shorter the height, the larger the distance between the plane mirror 110 and the final focal point. The sum of the distance between parabolic mirror 108 and plane mirror 110 and the distance between plane mirror 110 and the final focal point equals the focal length of the parabolic mirror 108.

Figure 6:
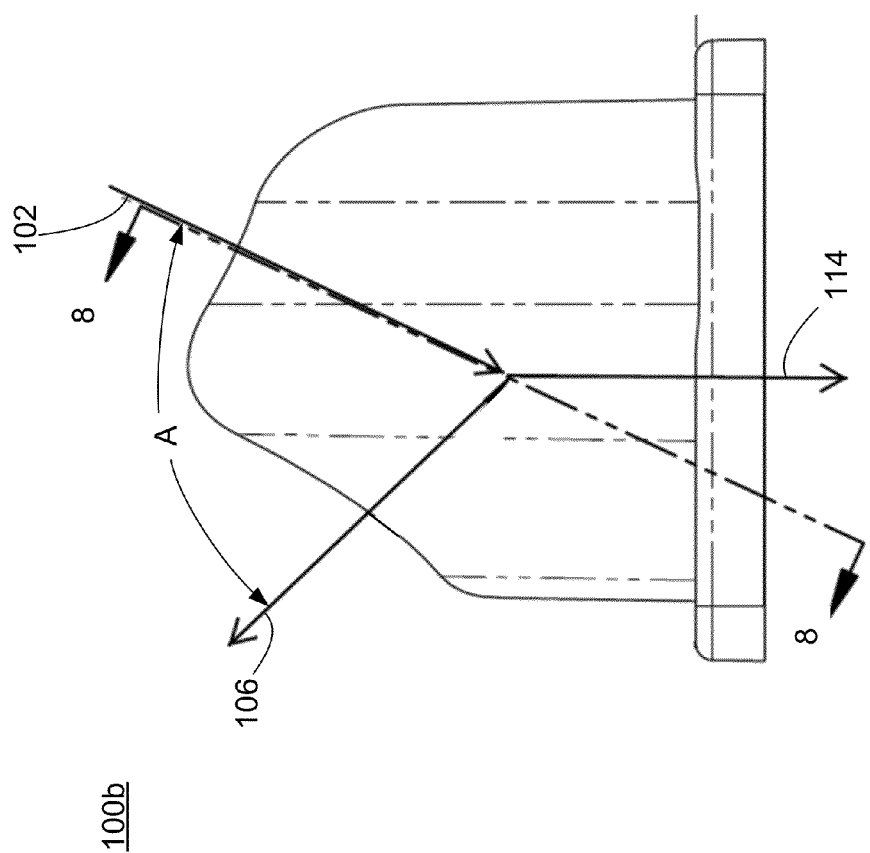
FIG. 6 illustrates a mold pull direction of a molded optical element, according to one embodiment.
Figure 7:
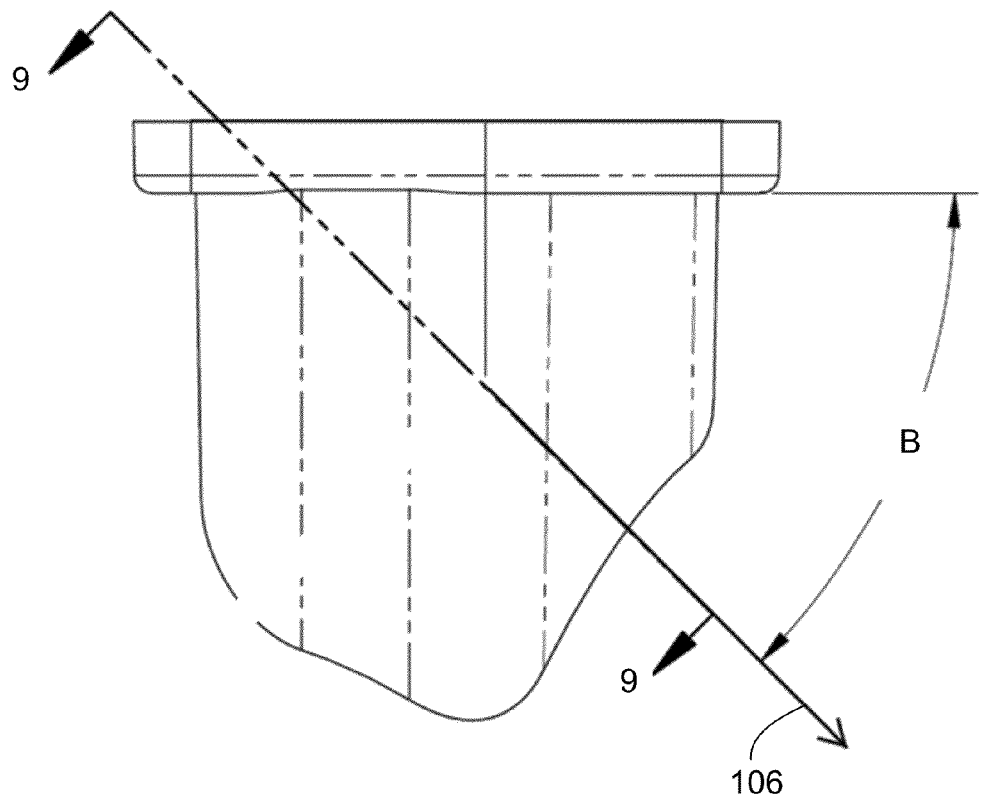
FIG. 7 illustrates a fourth view of a molded optical element, according to one embodiment.
Figure 9:
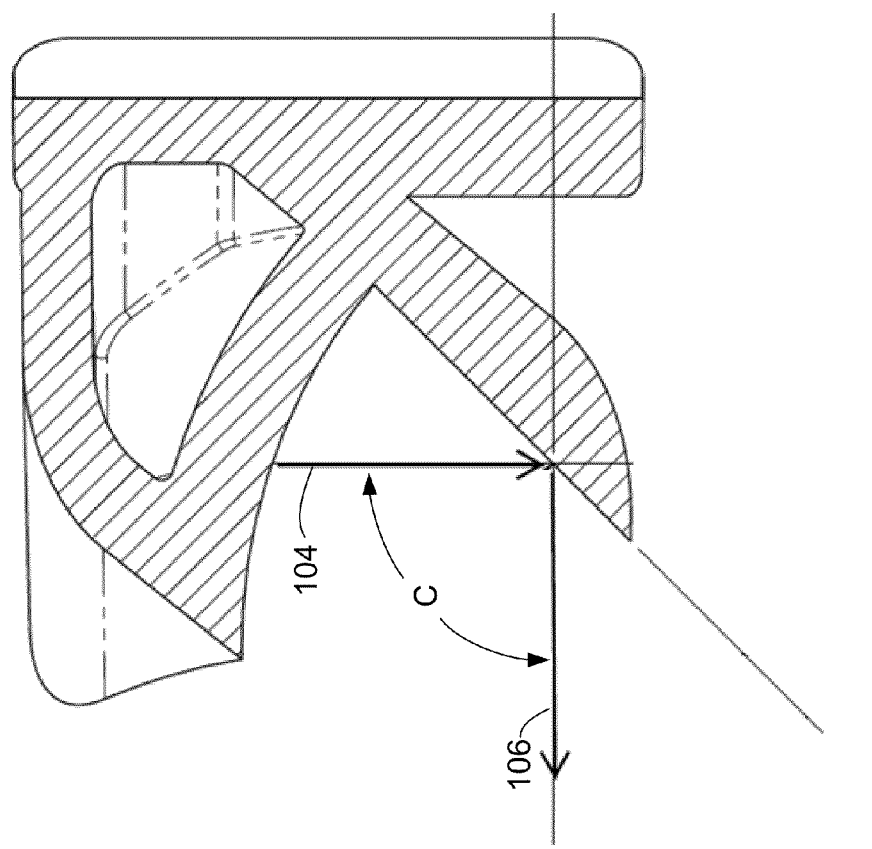
FIG. 9 illustrates a sixth view of a molded optical element, according to one embodiment.
Figure 10:
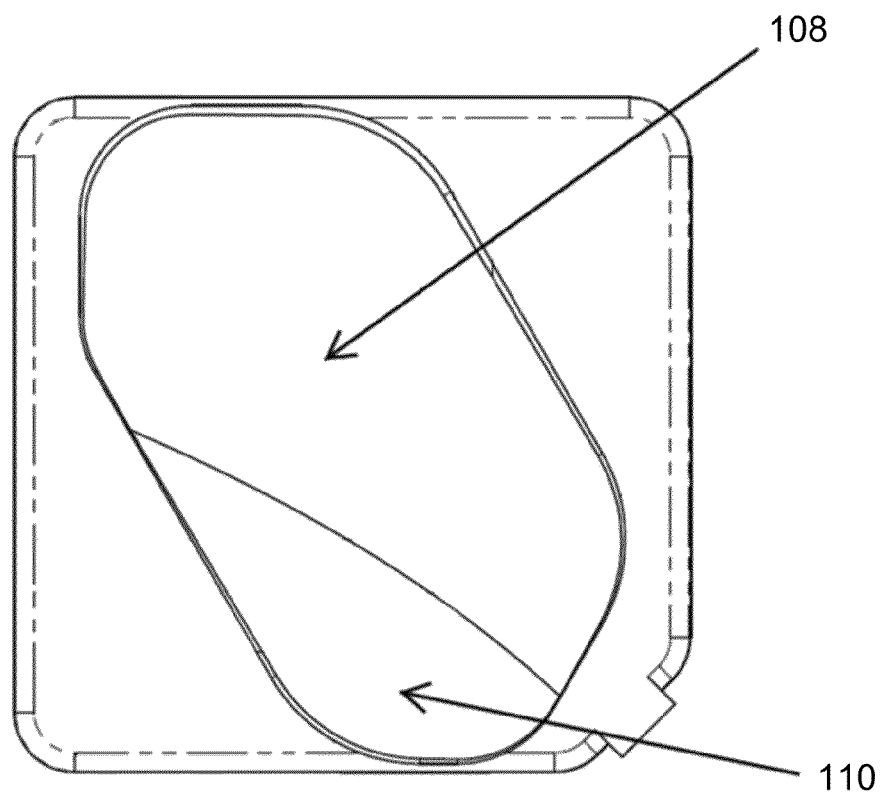
FIG. 10 illustrates a seventh view of a molded optical element, according to one embodiment.
Figure 11:
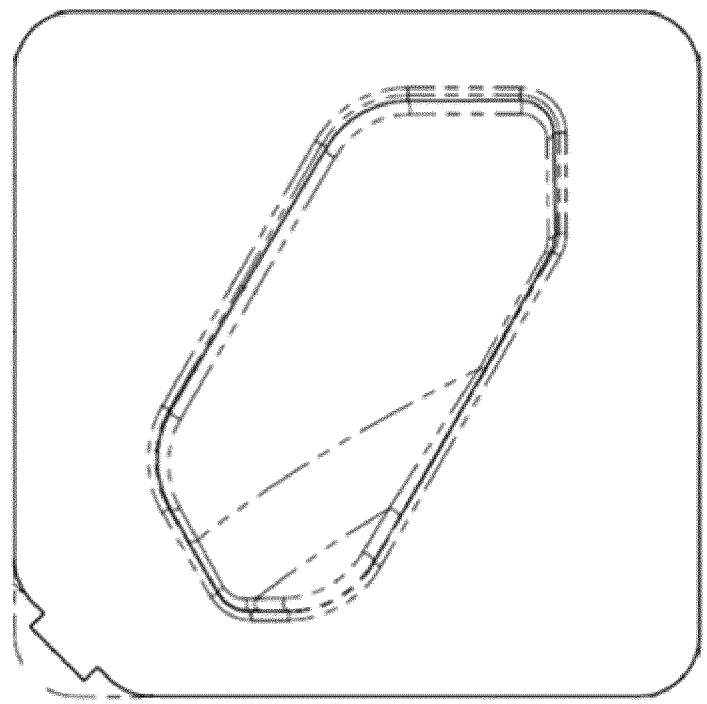
FIG. 11 illustrates a eighth view of a molded optical element, according to one embodiment.

In the same or a different embodiment, the geometric relationship between the plane mirror 110 and the parabolic mirror 108 may be described based on the angular relationships between angles of incidence and reflection for the collimated light beam 102, the converging beam 104 and the focused exit beam 106. As illustrated in FIG. 6, the optical element 100 is configured such that there is a first angle A between the collimated light beam 102 and the focused exit beam 106. Further, the plane mirror 110 is tilted at an angle B relative to a base of the molded optical component as illustrated in FIG. 7. Angle C represents the angle between converging light beam 104 and the focused exit beam 106, as illustrated in FIG. 9.

In one embodiment, the angle A is about 70 degrees, angle B is about 45 degrees and angle C is about 90 degrees. In another embodiment, the plane mirror tilt angle B is between about 24 degrees and 66 degrees, and angle C is between 48 degrees and 132 degrees.

In one embodiment, the molded optical component 100 is configured such that exit light 106 is focused such that the focal point of the parabolic mirror 108, taking into account the plane mirror 110, lies on an entrance slit of a wavelength dispersive element (not shown) of the Raman spectrometer.

Figure 3:
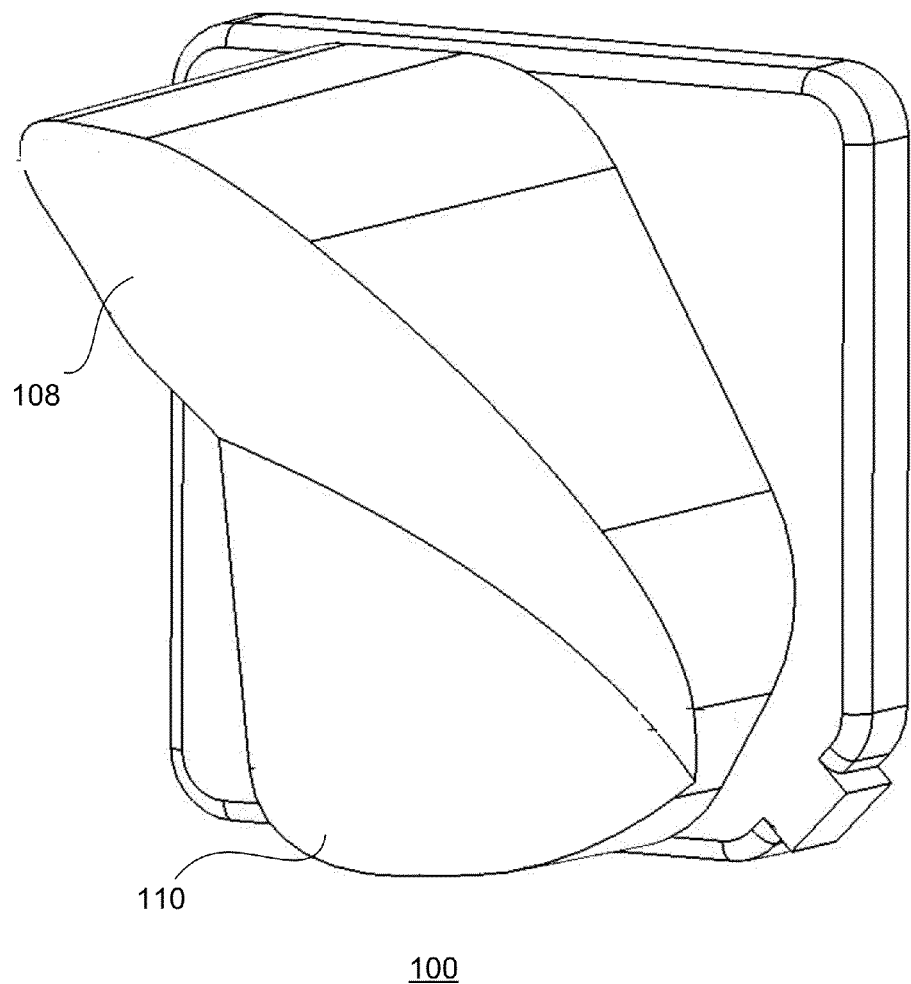
FIG. 3 illustrates a first view of a molded optical element, according to one embodiment.
Figure 4:
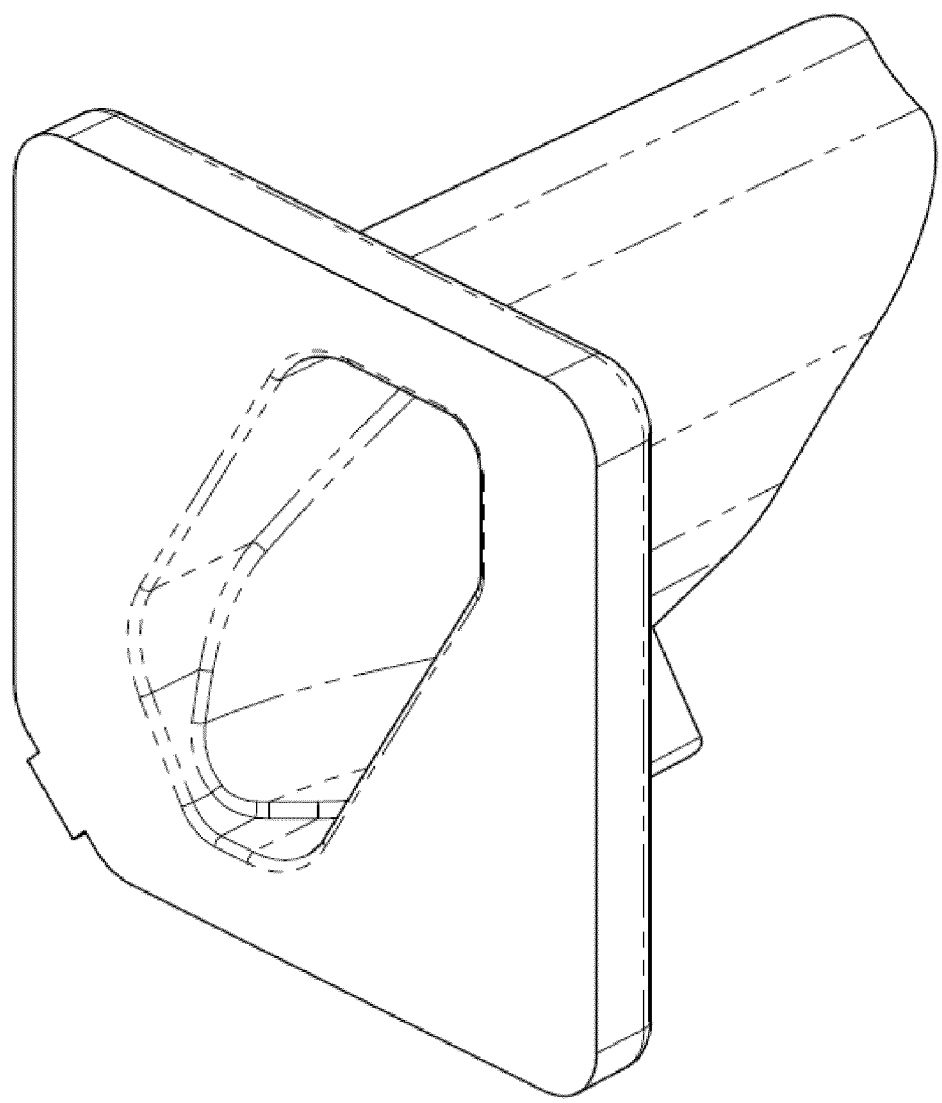
FIG. 4 illustrates a second view of a molded optical element, according to one embodiment.

FIGS. 3-4 provide additional illustrations of the optical element 100 from different points of view. The optical element 100 may be constructed using plastic and may be produced by an injection molding process. If the optical element 100 is produced by injection molding, the molded part must be removable from the mold when solidified. To allow for this, in one case all optical surfaces that will be used to reflect light are visible when viewed normal to the parting line of the mold. The optical surfaces of the optical element 100 include the surface for the parabolic mirror 108, and the surface for the plane mirror 110. In one case the portions of the mold that will form the optical surfaces of the optical element 100 are formed by a single specially machined mold insert. This ensures a fixed relationship between the reflective surfaces.

FIG. 6 illustrates a mold pull direction 114 of the optical element 100, according to one embodiment. The moldability of the optical element 100 takes into account the angle of the mirror surfaces (both the parabolic 108 and plane 110 mirror surfaces) relative to the mold pull direction 114. Both mirror surfaces are fully visible simultaneously when viewed in the pull direction 114. If a surface is facing the wrong way it creates an undercut that traps the part in the mold.

The reflective surfaces of the molded optical element 100 are coated with a coating of a reflective layer of metal. The optical surfaces of the optical element 100 are coated with gold or other reflective metal to reach a desired reflectivity. In one embodiment, the mirror surfaces are coated using vacuum metallization, also referred to as vacuum sputtering. Vacuum metallization deposits a thin layer of smooth metal that forms the surfaces of the mirrors on a molded plastic of the optical element. Vacuum metallization uses line of sight access to the optical surfaces to perform the coating.

The orientation of the optical surfaces relative to the coating source, e.g. the vacuum sputter, during the coating process affects the thickness and quality of the applied coating. During coating, the optical surfaces of the plane and parabolic mirrors of the optical element 100 are oriented in such a way that they are both tilted at approximately the same angle relative to the direction of the source of the reflective material 112. In one embodiment, this is accomplished by configuring the optical element 100 such that there is a 45 degree angle between the mold pull direction 114 and the direction of exit light 106.

Figure 5:
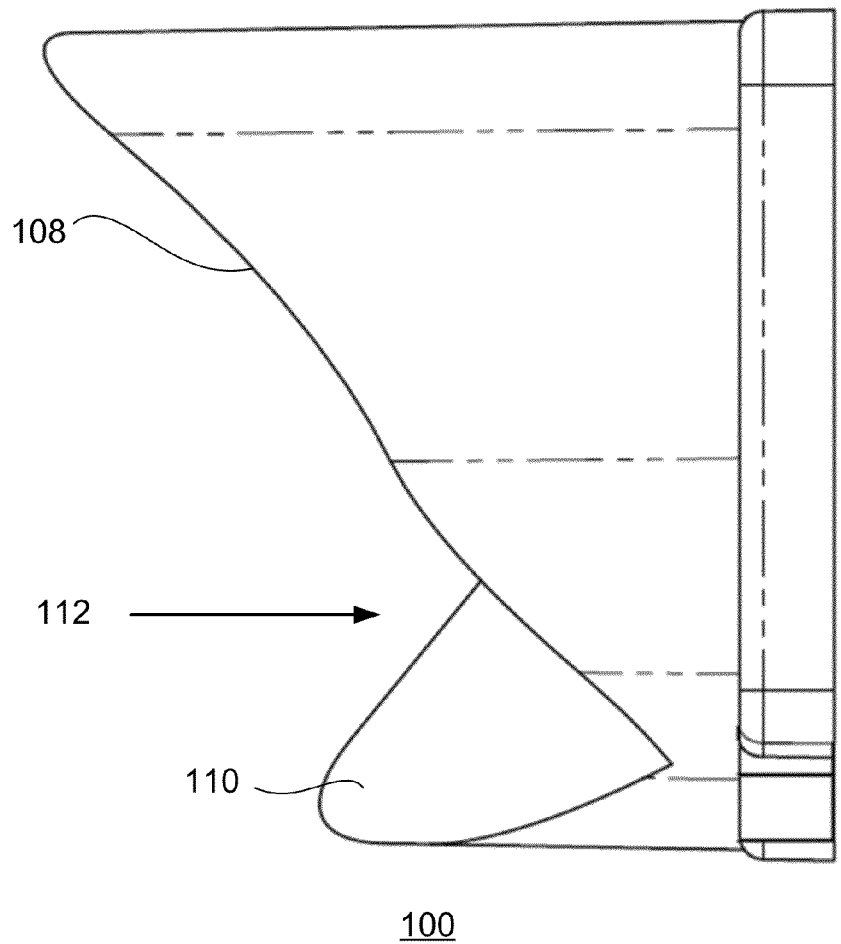
FIG. 5 illustrates a third view of a molded optical element, according to one embodiment.

By facing the surfaces towards the source, a uniform layer of metallization is coated on the mirror surfaces. Surfaces that are tilted at a high angle of incidence to the source, for example higher than 60 degrees angle of incidence, may be unevenly coated and not have the desired reflectivity. In one embodiment, to achieve acceptably uniform coating quality on both mirror surfaces simultaneously the mirror surfaces are oriented in a balanced manner that approximately bisects the angle between the mirrors. FIG. 5 illustrates an orientation of the optical element 100, relative to the direction 112 at which material will be vacuum sputtered onto the optical surfaces, according to one embodiment.

FIGS. 5-11 illustrate the optical element 100 from different perspectives, according to one embodiment. In one specific example, the optical element 100 is constructed with the following parameters. As noted below, the examples provided in this paragraph are merely exemplary and are not included to delineate or circumscribe the inventive subject matter. In one example, the parabolic mirror 108 has an optical power tolerance of 5 fringes at 633 nm, and a surface irregularity tolerance of 5 fringes at 633 nm. In one example, the optical element 100 has a scratch-dig (surface quality) of 60-40. In one example, optical element 100 has an optical surface roughness of 100 angstroms, maximum. In one example, the molded portion of the optical element 100 is made of cyclo olefin polymer, for example using Zeonor 1060R. In one example, the coating applied to the molded portion to form the mirror surfaces is made of gold. In one example, an overcoat is applied to protect the metallic surface. The overcoat may be made of any dielectric oxide, for example an oxide with an average reflectivity of 97% or greater at 850-940 nm. In another example, the optical element may be formed using a single piece of molded glass.

Figure 12:
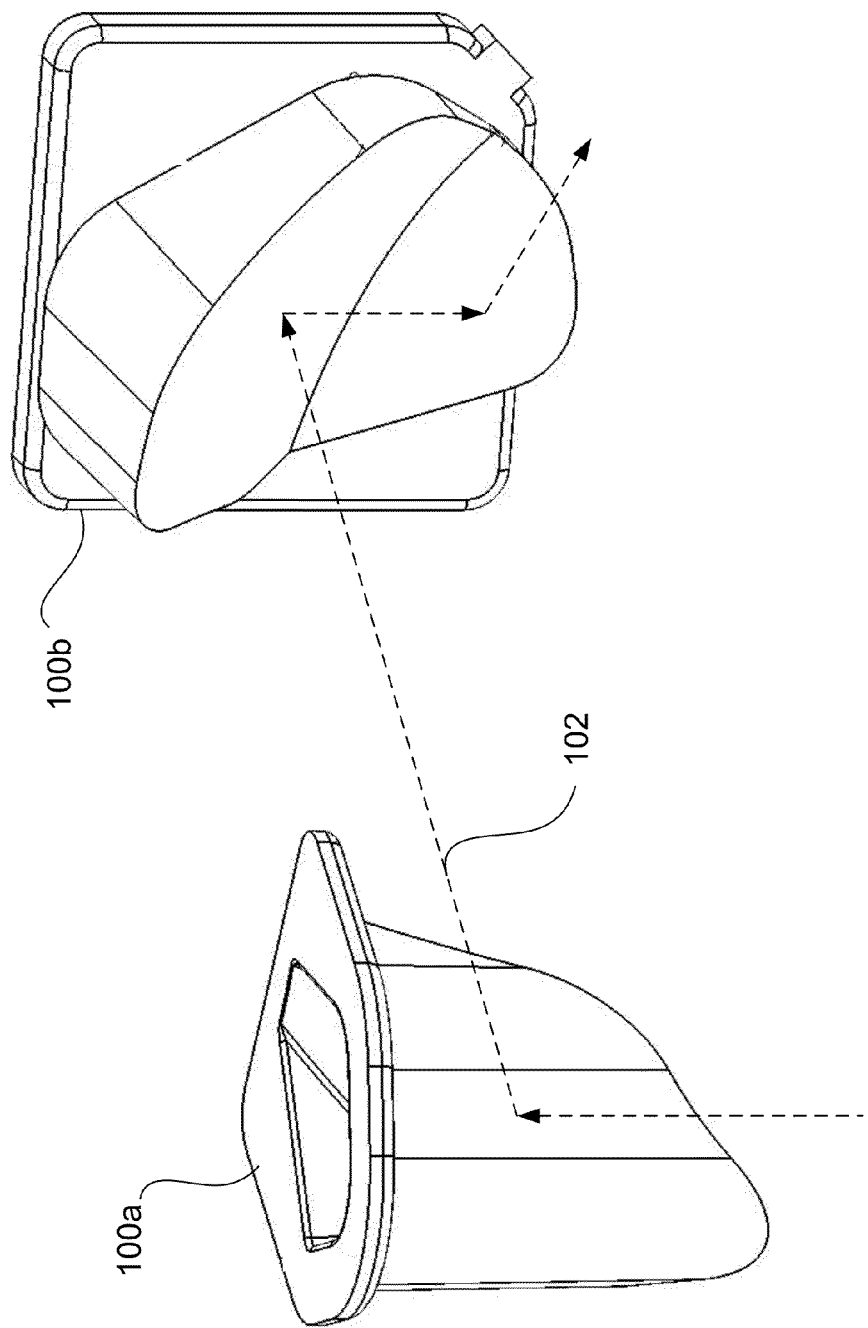
FIG. 12 is a diagram illustrating the reflection of a single ray of light by a pair of molded optical elements, according to one embodiment.
Figure 13:
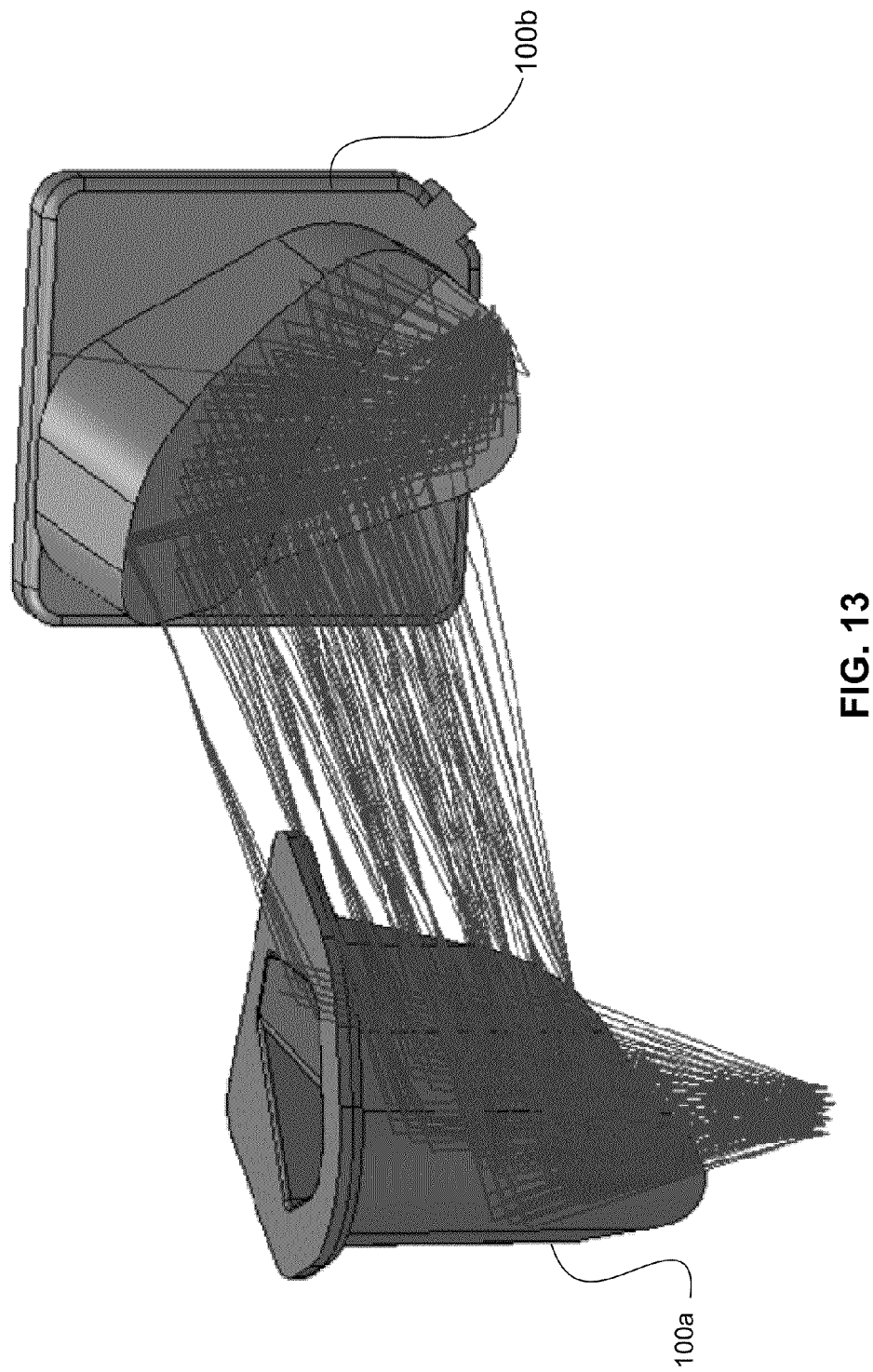
FIG. 13 is a diagram illustrating the reflection of a plurality of rays of light by a pair of molded optical elements, according to one embodiment.

FIG. 12 and FIG. 13 illustrate the reflection of light through a pair of identical reflective optical elements 100a and 100b, according to one embodiment. The optical elements 100 are faced towards each other so as to collect and relay light to the spectrometer. The first optical element 100a collects diverging light emitted from a sample and produces collimated relay light beam 102. The collimated light beam 102 strikes the second optical element 100b which focuses the light before directing it towards a detector. The second optical element 100b has the same structure as the first optical element 100a, resulting in an output focal length that is the same as the input focal length. In one embodiment only the parabolic mirror or parabolic mirror of optical element 100a is used to direct light to or from a sample.

Additional Considerations

Although above the optical element 100 has been described with respect to an optical path including incident collimated light 102 through to outgoing exit light 106, the optical element 100 functions equivalently in reverse. Light may be incident to the plane mirror 110, reflected towards the parabolic mirror 108, and sent outward as collimated light.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A optical element comprising a single molded piece, the single molded piece comprising a parabolic mirror and a plane turning mirror, the parabolic mirror configured to reflect incident substantially collimated light and to converge the reflected light, the plane mirror positioned with respect to the parabolic mirror such that at least a portion of a surface of the plane mirror is located less than a focal length of the parabolic mirror away from the parabolic mirror, the plane mirror oriented with respect to the parabolic mirror such that the converging light incident on the plane mirror from the parabolic mirror is reflected as exit light by the plane mirror in an outward direction that differs from a direction from which the collimated light was incident on the parabolic mirror.

2. The optical element of claim 1 wherein the plane mirror and the parabolic mirror each comprise a reflective coating.

3. The optical element of claim 1 wherein the single molded piece further comprises a base, and the plane mirror is oriented at an angle between zero and ninety degrees with respect to the base.

4. The optical element of claim 1 wherein the plane turning mirror is positioned with respect to the parabolic mirror such that the converging light from the parabolic mirror hits the surface of the plane mirror after traveling a distance less than a focal length of the parabolic mirror from the parabolic mirror.

5. The optical element of claim 1 wherein the parabolic mirror is configured to reflect substantially collimated light incident along a first axis, and to converge the reflected light towards a virtual focal point located along a second axis perpendicular to the first axis.

6. The optical element of claim 5 wherein the optical element is further configured such that the exit light focuses at a final focus point located in a plane defined by the second axis and a third axis perpendicular to the first and second axes.

7. The optical element of claim 6 wherein the final focus point is offset at a nonzero angle from the third axis relative to a point on the surface of the plane mirror.

8. The optical element of claim 7 wherein the nonzero angle is 20 degrees.

9. The optical element of claim 7 wherein the point on the surface of the plane mirror is the point at which a center of the converging beam is incident on and is reflected from the plane mirror.

10. The optical element of claim 1 wherein the optical element is configured such that there is a nonzero angle A between an outward direction at which the plane mirror reflects outward the exit light, and an incident direction at which the parabolic mirror receives the collimated light, wherein the nonzero angle A is approximately 70 degrees.

11. The optical element of claim 1 wherein the optical element is further configured such that there is a nonzero angle B between the plane mirror and a base of the optical element, wherein the nonzero angle B is between 24 and 66 degrees, inclusive.

12. The optical element of claim 1 wherein the optical element is further configured such that there is a nonzero angle C between a direction around which plane mirror receives the converging light from the parabolic mirror, and a direction at which the plane mirror reflects outwardly reflects the converging light, wherein the nonzero angle C is between 48 and 132 degrees, inclusive.

13. A optical element comprising a single molded piece, the single molded piece comprising:
  a parabolic mirror means for reflecting and converging incident substantially collimated light;
  a planar mirror means for reflecting light incident from the parabolic mirror means, the plane mirror means positioned with respect to the parabolic mirror means mirror such that the converging light from the parabolic mirror means hits a surface of the plane mirror means after traveling a distance less than a focal length of the parabolic mirror means from the parabolic mirror means, the planar mirror means oriented such that the converging light incident on the planar mirror means is reflected outward as exit light by the planar mirror means in an outward direction that differs from a direction at which the collimated light was incident on the parabolic mirror means.

14. A optical element comprising:
  a single molded piece, the single molded piece comprising:
    a parabolic mirror, the parabolic mirror configured to reflect substantially collimated light incident along a first axis, and to converge the light towards a virtual focal point located along a second axis perpendicular to the first axis,
    a plane turning mirror positioned with respect to the parabolic mirror such that the converging light from the parabolic mirror hits a surface of the plane mirror after traveling a distance less than a focal length of the parabolic mirror from the parabolic mirror, the plane mirror reflecting the incident converging light outward as exit light, the exit light focusing at a final focus point located a nonzero distance from the surface of the plane mirror, the final focus point located in a plane defined by the second axis and a third axis perpendicular to the first and second axes, the final focus point offset at a nonzero angle from the third axis relative to a point on the surface of the plane mirror.

15. The optical element of claim 14 wherein the point on the surface of the plane mirror is the point at which a center of the converging beam is incident on and is reflected from the plane mirror.

* * * * *